Figure 1:
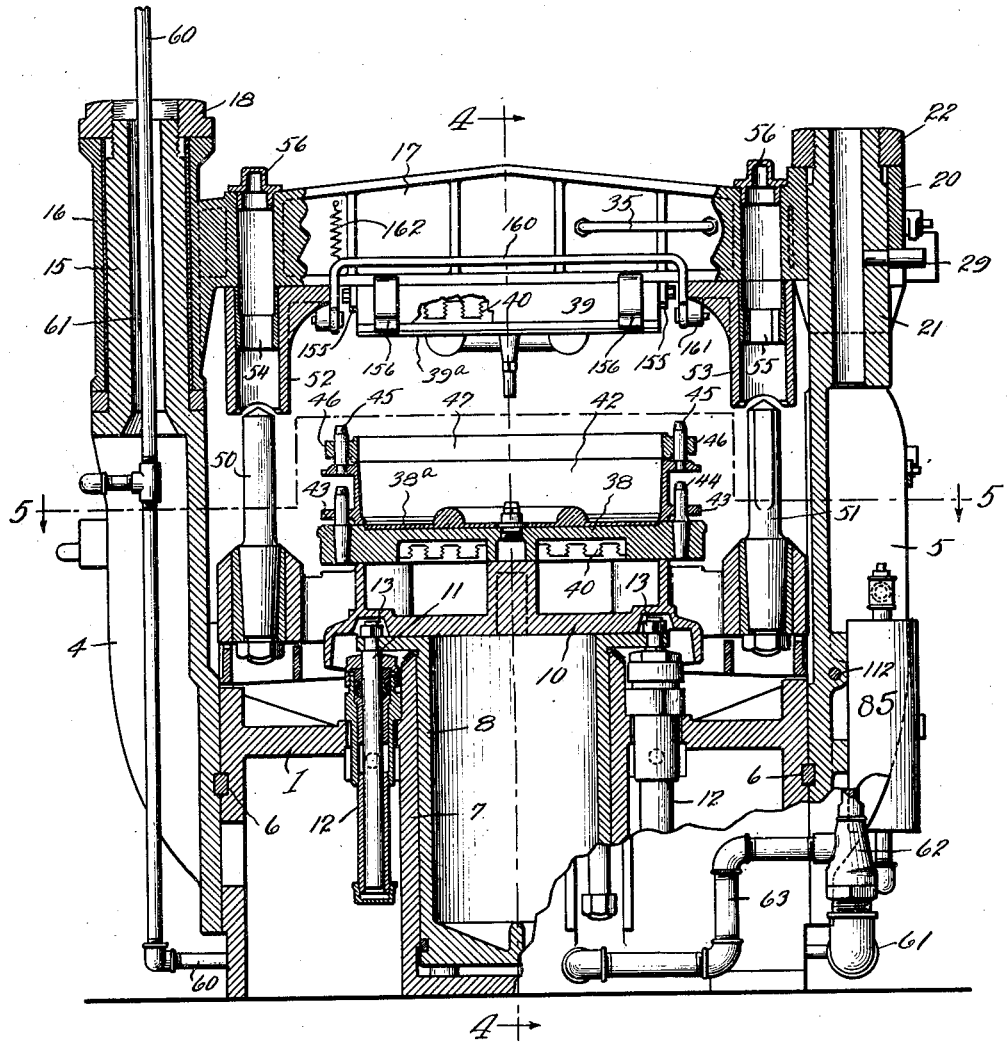

April 17, 1928.  
F. E. McCABE  
MOLDING MACHINE  
Filed Aug. 21, 1924

1,666,577

7 Sheets-Sheet 1

Inventor  
Frank E. McCabe  
By Hull, Brock & West  
Attys.

April 17, 1928.  
F. E. McCABE  
MOLDING MACHINE  
Filed Aug. 21, 1924

1,666,577

7 Sheets-Sheet 2

Inventor  
Frank E. McCabe  
By Hull, Brock & West  
Attorneys

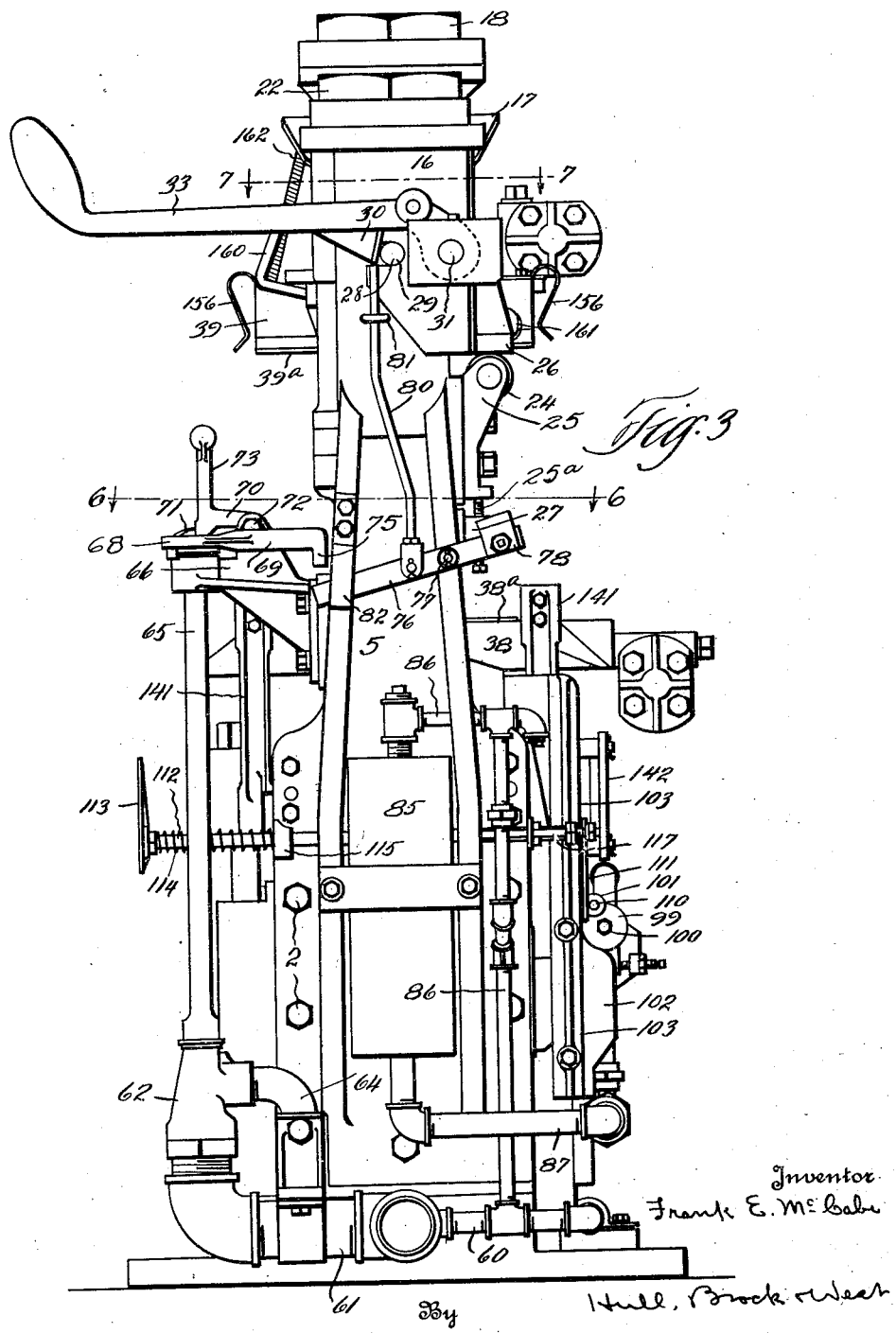

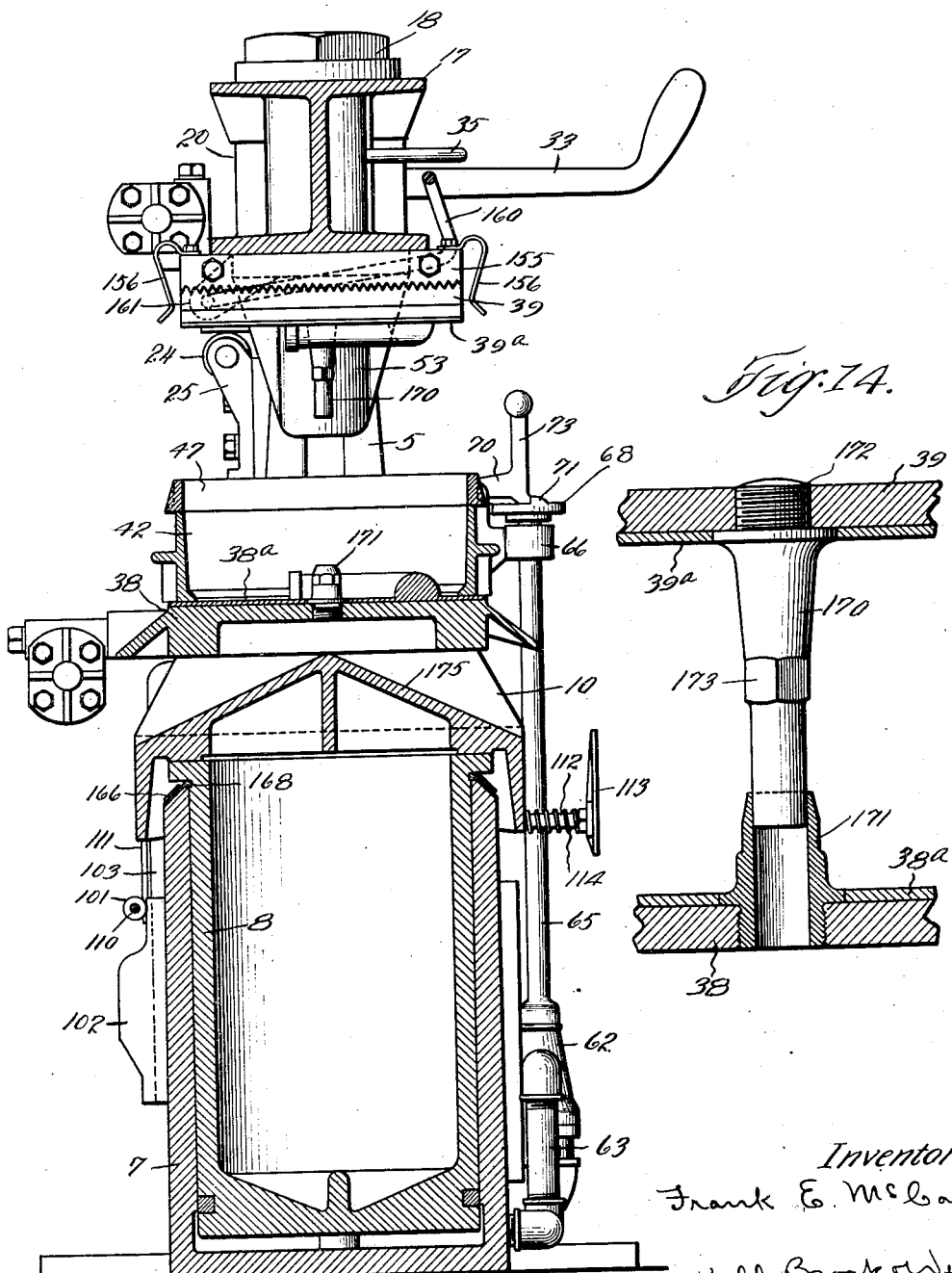

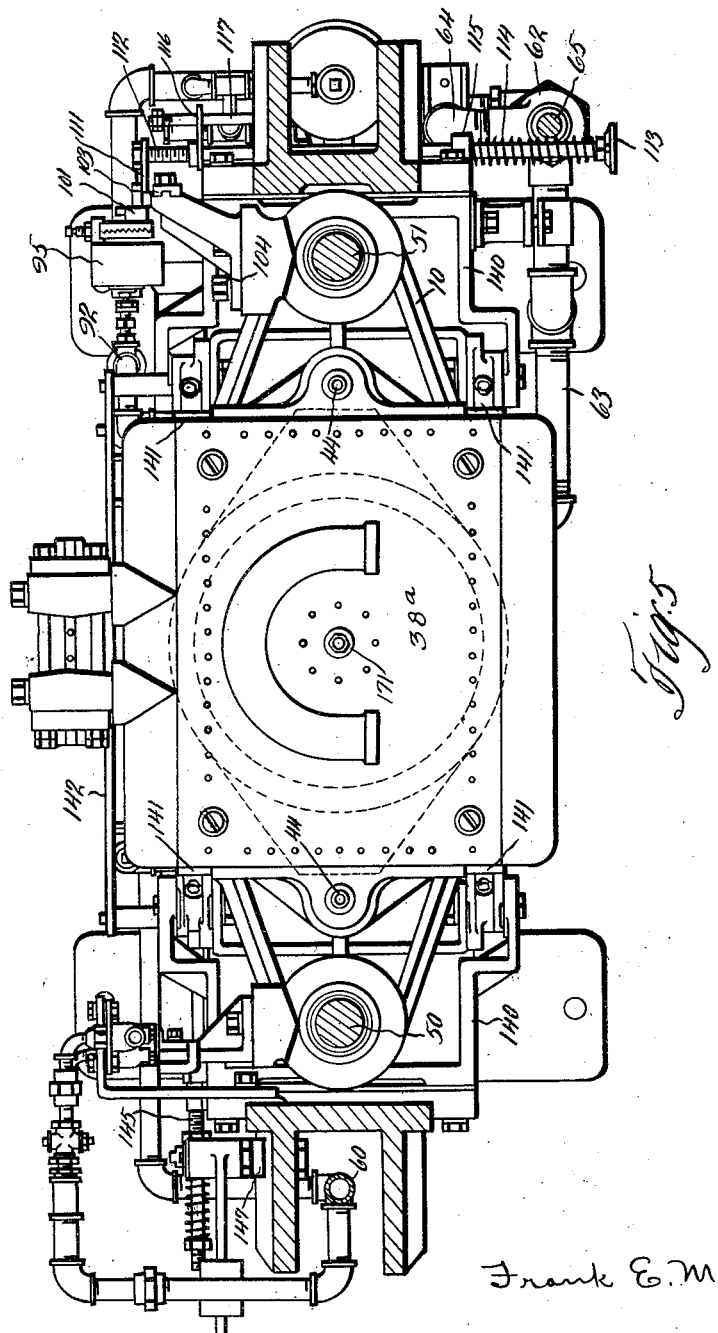

April 17, 1928. 1,666,577
F. E. McCABE
MOLDING MACHINE
Filed Aug. 21, 1924 7 Sheets-Sheet 6
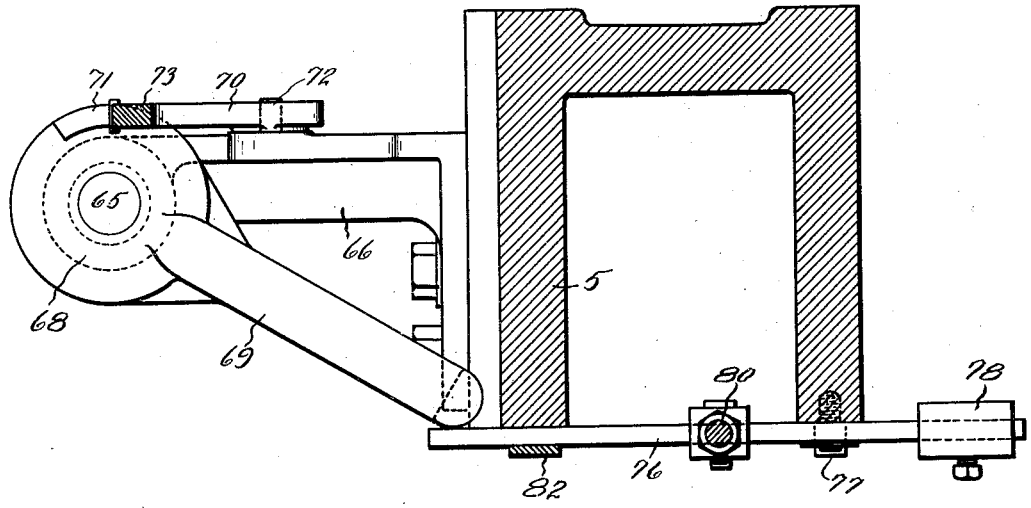
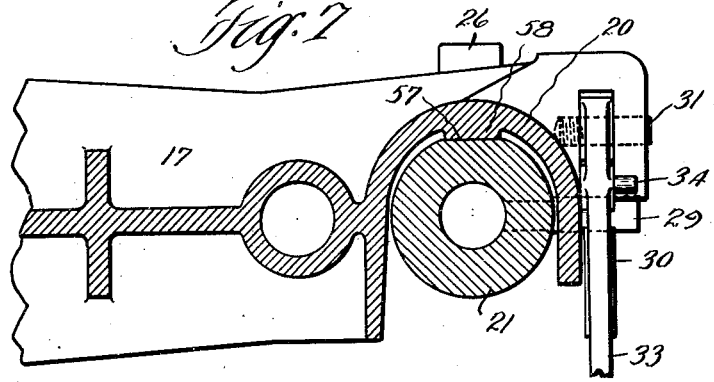
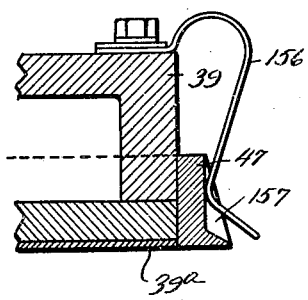
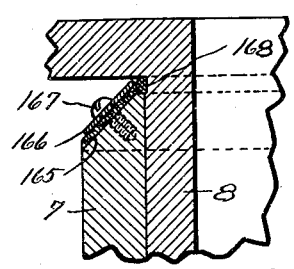
Inventor
Frank E. McCabe
By Hull, Brock & West
Attys.

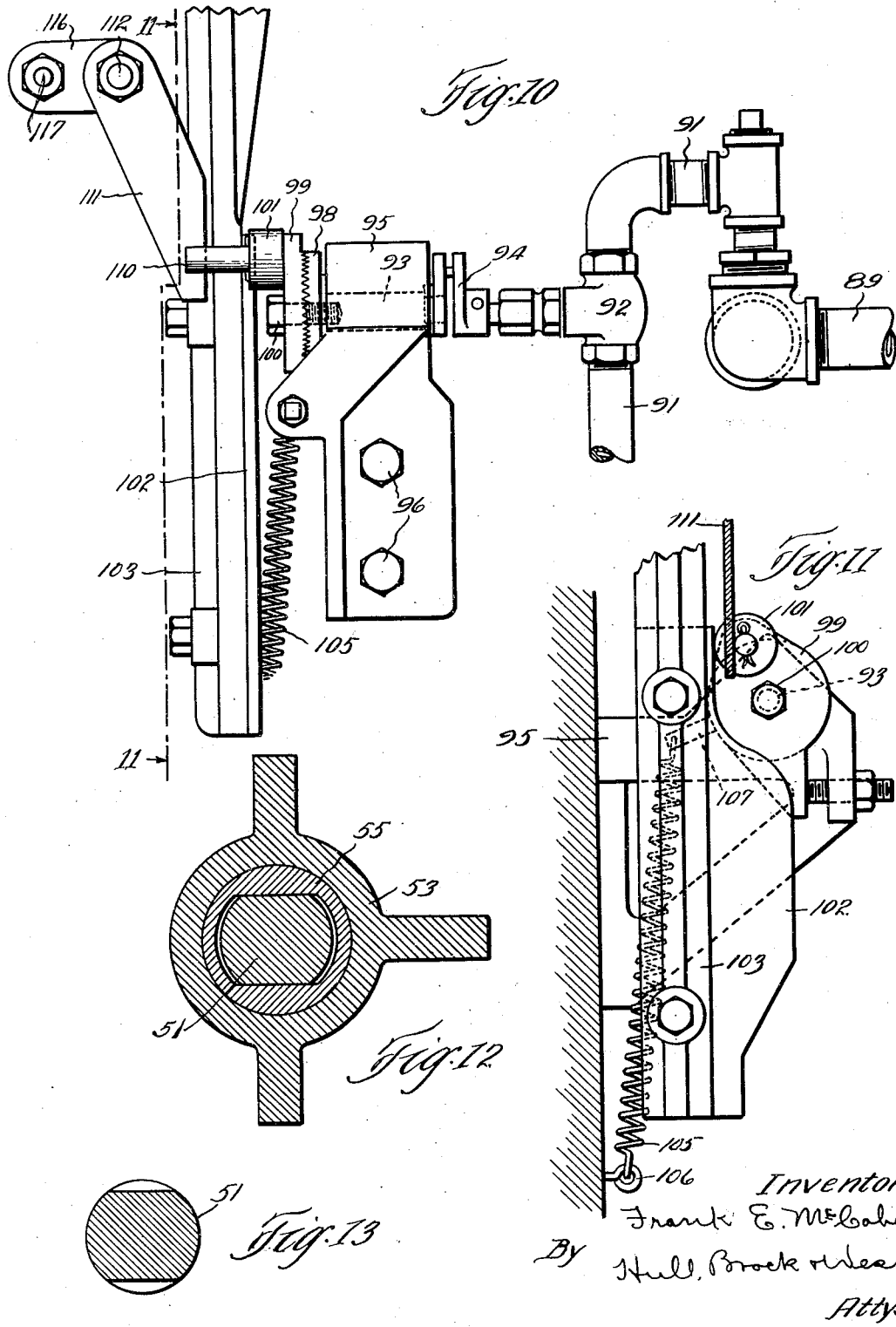

Patented Apr. 17, 1928.

1,666,577

UNITED STATES PATENT OFFICE.

FRANK E. McCABE, OF CHAGRIN FALLS, OHIO, ASSIGNOR TO THE RATHBONE MACHINE COMPANY, OF CLEVELAND, OHIO, A CORPORATION OF OHIO.

MOLDING MACHINE.

Application filed August 21, 1924. Serial No. 733,364.

This invention relates to improvements in molding machines and the general purposes of the invention are to provide a machine of this character that is highly efficient; that is easy and convenient of use; and wherein the retraction of the ramming head at a variable speed is automatically controlled thereby to insure rapid and uniform production of molds of very high quality, as will hereinafter appear.

Some of the more specific objects of the invention are to provide, in a molding machine comprising a pressure head that is adapted to be swung to and from a position over a vertically movable ramming head, means for properly aligning the two heads during the mold-forming operation and which allows for expansion and contraction of the pressure head; to provide safety means for preventing the operation of the machine except when the two heads are in operative relation; to provide a further safety contrivance which protects the hands of the operator from being caught between parts carried by the respective heads by requiring him to use both hands to set the machine in operation; to provide reliable means for automatically controlling the retraction of the ramming head as above stated which effects the very essential slow movement of said head while the patterns are being withdrawn from the molds and allows a quicker movement thereof at other times so as not to retard production; to provide manually operable means for rendering said automatic control means ineffective at will as when the pattern-drawing operation has been completed thereby to enable the operator to further increase the speed of the machine; to provide means for automatically removing the sand frame from the flask after the mold has been compressed and which serves to sustain the frame in convenient reach of the operator until the same is required for a subsequent operation; to provide a device for dislodging the sand frame from said sustaining means; to provide changeable stops or abutments for limiting the movement of the sand frame during the mold forming operation whereby sand frames of different depths may be provided for, said stops or abutments preferably being so designed as to prevent the presence of sand between the sand frame and said stops or abutments from having any effect upon the accurate positioning of the sand frame; and to provide, in combination with certain correlated features, an efficient sprue cutter that is especially suitable for use in connection with machines of the class to which this invention relates.

Figure 2:
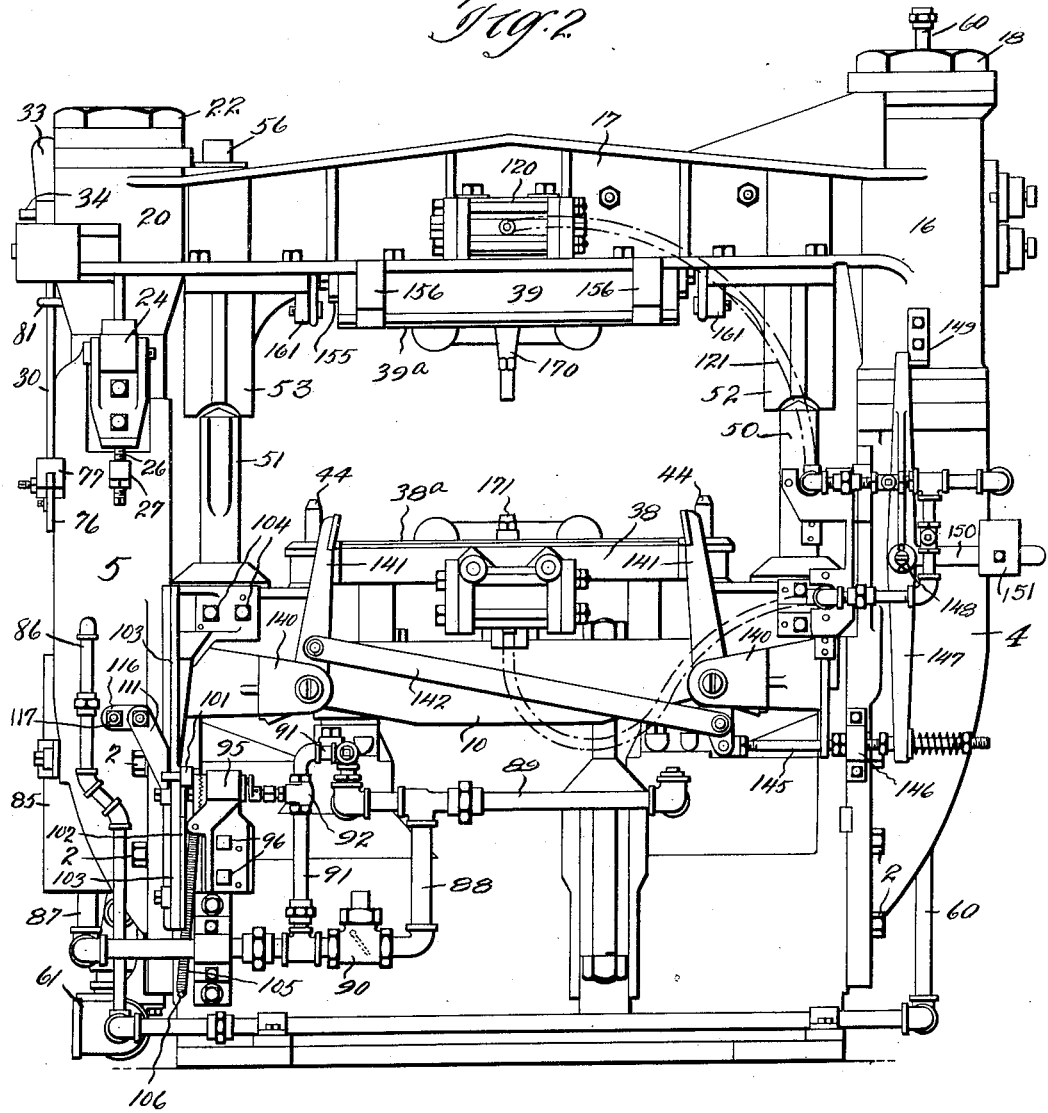

The objects above enumerated, with others which will appear as this description proceeds, are attained in the construction illustrated in the accompanying drawings wherein Fig. 1 is a sectional front elevation of a molding machine embodying my improvements; Fig. 2 is a rear elevation of the machine; Fig. 3 is a right hand end elevation; Fig. 4 is a central vertical section from front to rear, and Fig. 5 a horizontal section, of the machine, said sections being taken substantially on the respective lines 4—4 and 5—5 of Fig. 1; Fig. 6 is a sectional detail substantially on the line 6—6 of Fig. 3 and showing safety features associated with the valve through which the operation of the machine is controlled, this view being on a scale considerably enlarged over that of the former views; Fig. 7 is a sectional detail on the line 7—7 of Fig. 3; Fig. 8 is a detail of the sand frame sustaining means; Fig. 9 is a detail of the dust ring which surrounds the open end of the cylinder; Fig. 10 is a detail of the automatic control which governs the descent of the ramming head; Fig. 11 is a section substantially on the line 11—11 of Fig. 10; Fig. 12 is a horizontal section through one of the pilot pins and its socket or guide which aid in properly aligning the ramming head and pressure head; Fig. 13 is a corresponding view of the pilot pin only; and Fig. 14 (Sheet 4) is a detail of the sprue cutter.

The machine comprises, generally, a frame structure that is composed of a base 1 to the ends of which are secured, as by cap screws 2, vertical columns 4 and 5, the columns being accurately positioned with respect to the base and maintained in such relation thereto by keys 6 that occupy keyways in the columns and base.

Operating within an upwardly opening cylinder 7 that is incorporated in the base 1 is a piston 8 to the flanged upper end of which is fastened a ramming head 10. The piston 8, and consequently the ramming head 10, are held against turning with respect to the base by plungers 11 that operate within dash pots 12 that are suitably supported within the base. The upper ends of the plungers are shown as reduced in diameter and extended through holes in the flange of the piston 8 beyond which they are threaded for the application of nuts 13. A further and more important function of the plungers and dash pots is to control the descent of the ramming head as will hereinafter more fully appear.

The lower portions of the columns 4 and 5 are preferably of channel formation while their upper ends are made cylindrical. The cylindrical upper end of the column 4 constitutes a bearing 15 upon which is journaled a sleeve 16 that is shown as formed integral with one end of a pressure head 17. The journal is suitably bushed in accordance with usual practice, and the sleeve 16 is held down by a nut 18 that is screwed onto the upper threaded end of the bearing 15. The end of the pressure head 17 opposite the sleeve 16 is formed to provide a yoke 20 (see Fig. 7) that is adapted to embrace the cylindrical portion 21 of the column 5. The free end of the pressure head—or that which incorporates the yoke 20—is adapted to be held down by a nut 22 that is screwed onto the reduced and threaded upper end of the column 5. In order to insure the free end of the pressure head being brought up against the nut 22 when the head is swung to operative position, I employ an anti-friction bearing in the form of a roller 24 (Figs. 2, 3 and 4) that is supported, through a bracket 25, from the column 5, and over which an extension 26 of the pressure head travels as the head approaches operative position. To facilitate construction by avoiding too accurate dimensions of the parts, as well as to compensate for any wear which may occur, I make the bracket 25 adjustable with respect to the column 5, as by resting it upon an adjusting screw 25ª that is threaded through a boss 27 extending rearwardly from the column. When the pressure head is in operative position, a notch 28 in the outer side of the yoke 20 is occupied by a pin 29 that projects from the side of the cylindrical portion 21 of the column 5. To lock the pressure head in such position I employ a latch 30 which is arranged to engage the pin 29 and which is pivoted at 31 to the pressure head. The latch involves a lever 33 by means of which it may be conveniently operated and which lever serves as a weight to depress the latch and maintain it in effective position. To restrain the latch from dropping below a position wherein it will automatically ride over the pin 29 when the pressure head is swung to operative position, I provide a stop 34 which is arranged to engage an adjacent portion of the yoke. The pressure head is equipped with a handle 35 by means of which it may be swung to and from operative position.

Secured, respectively, to the ramming head 10 and the pressure head 17 are pattern frames 38 and 39 and to these frames are attached the patterns 38ª and 39ª, respectively. The pattern frames are shown as hollow and preferably contain suitable electrical heaters indicated generally at 40 for heating the patterns sufficiently to dry the sand about them and thus facilitate withdrawing the patterns from the mold cavities.

A mold flask 42 is adapted to be placed upon the pattern frame 38, and the same is provided with ears 43 which extend from its ends and have apertures which receive the positioning pins 44 that rise from the pattern frame. The flask, in turn, supports positioning pins 45 which cooperate with perforated ears 46 that extend from the ends of a sand frame 47 that is adapted to be applied to the top of the flask for a purpose which shall presently appear.

To insure proper alignment of the cooperating parts which are carried by the respective heads, I employ pilot pins 50 and 51 which are supported by the ramming head 10 and are adapted to enter socket members 52 and 53 that are attached to the underside of the pressure head 17. The respective sockets contain bushings 54 and 55 wherein the pilot pins have a sliding fit. The pressure head is formed with openings that align with the sockets, and said openings are adapted to be closed by caps 56. It is found that a certain amount of expansion and contraction of the pressure head is caused by the heat from the electric heater 40 that is housed within the pattern frame 39, and on account of this I provide for relative movement in a lateral direction between the pilot pin 51 and the bushing 55, as well as between the yoke 20 and the portion 21 of the column 5 wherewith the yoke cooperates, it being found unnecessary to make such provision with respect to the pilot pin 50 and bushing 54 because of the nearness of these parts to the pivoted end of the pressure head. The variation in the length of the head between its pivotal axis and the pin 50 is negligible. By referring to Figs. 1, 12 and 13 it will be seen that the pin 51 is flattened on its front and rear sides, and that the opening in the bushing 55 is correspondingly shaped but has a longitudinal axis greater than the diameter of the pin. This arrangement results in the pressure head being properly positioned in a fore-and-aft direction but allows for slight variation in its longitudinal dimension due to expansion and contraction. In Fig. 7, the relative sizes of the cylindrical portion 21 of the column 5, and the interior of the yoke 20, are clearly shown. It will be observed that the rear side of the portion 21 is flattened, as indicated at 57, for cooperation with a flattened rib 58 that is formed on the adjacent portion of the yoke.

The machine is operated by pressure fluid that is conducted to the lower end of the cylinder 7 through a system of piping which I shall now describe. A pipe 60 leads from any suitable source of pressure fluid, such as compressed air, and, for convenience, is extended downwardly through an opening in the bearing 15 of the column 4, the pipe descending to within a short distance of the floor and then being directed rearwardly about the machine to the right hand side thereof where it is extended forwardly and joins an accumulator 61. A valve 62, which is a three-way valve, controls the passage of pressure fluid from the accumulator 61, through a pipe 63, to the lower end of the cylinder 7, as well as controlling the exhaust of the pressure fluid from the cylinder through the same pipe 63, and a branch 64 which extends from the rear side of the valve 62. The valve is adapted to be actuated by a stem 65 which rises to a height that is convenient to the operator and is journaled at its upper end in a bracket 66 that extends forwardly from the column 5. Above the bracket 66 the stem has secured to it the hub portion 68 of an operating handle 69. This handle is adapted to be held in the position which it occupies when the valve 62 is closed by a dog 70 that normally reposes in a position to be engaged by a lug 71 on the hub portion 68 of the handle. The dog is pivoted at 72 to the bracket 66 and incorporates a grip portion 73 by means of which it may be rocked out of the path of the lug 71, thereby to release the handle 69 and allow the valve 62 to be opened. This dog constitutes a safety device because it requires the operator to use both hands for starting the machine in operation, thus safeguarding against his having one of his hands in a position where it might be caught between the parts that are carried by the ramming and pressure heads.

A further safety contrivance is included for venting the operation of the machine when the pressure head occupies any position other than operative position. It will be observed that the outer end of the operating handle 69 is turned downwardly, as indicated at 75, and reposing adjacent this turned-down end of the handle is the forward end of a lever 76 that is pivoted at 77 to the column 5 and has secured to its rear end a weight 78. This weight tends to elevate the front end of the lever and retain it in the path of movement of the turned-down end 75 of the lever 69; and it is only when the pressure head is in operative position that the free end of the lever is depressed and thus removed from the position wherein it blocks the operation of the handle 69. The depression of the lever, in opposition to the weight 78, is effected through a rod 80 that is pivotally connected to the lever, forwardly of its pivot point. This rod extends upwardly through a guide 81 which retains it in a position to be engaged by the nose of the latch 30. It will be seen from this that when the pressure head is swung rearwardly, carrying with it the latch 30, that the weight 78 is permitted to rock the lever 76 to effective position. The forward end of the lever 76 is confined to a vertical course of movement by a finger 82 that extends outwardly and downwardly from the column 5 and is engaged over the outer side of the lever.

Suitably sustained within the channel portion of the column 5 is an oil reservoir 85, and pressure fluid is conducted to the upper end of said reservoir through a branch 86 of the supply pipe 60. A pipe 87 leads from the lower end of the oil reservoir to a riser 88 which connects at its upper end with a horizontal pipe 89 that leads to the previously mentioned dash pots 12. A check valve 90 is placed within the pipe 87 adjacent the riser 88 to prevent return flow from the dash pots to the reservoir through the course just described. The return of oil to the reservoir is permitted, however, through a pipe 91 which leads from the pipe 89 to a point in the pipe 87 in advance of the check valve 90. The pipe 91 includes a valve 92 which is preferably in the nature of a needle valve and to the stem thereof is connected a short shaft 93 (see Figs. 10 and 11) through a suitable so-called "universal" coupler 94. The shaft 93 is supported within a bracket 95 which is secured, as by screws 96, to the rear side of the base 1. To the end of the shaft 93 remote from the valve 92 is fastened a head 98, and adjustably secured to said head is a plate 99. The cooperating faces of the plate 96 and head 98 are shown as serrated, and the plate is clamped to the head by suitable means, as by a screw 100. By relaxing this screw, the plate may be readily moved with respect to the head, and when the screw is subsequently tightened, the plate will be effectively held against movement with respect to the head by the cooperation of the engaging serrated faces of the plate and head. Mounted upon the plate 99, eccentric of the axis of the shaft 93, is a roller 101 that is arranged to traverse the face of a cam 102 that is carried by a leg 103 which depends from the ramming head 10, said leg being shown as secured to said head by screws 104. A spring 105 has its lower end anchored at 106 to the base of the machine and its opposite end connected to a pin 107 that extends radially from the plate 99. This spring tends to rock the plate 99, and parts connected thereto, in a direction to close the valve 92 and to engage the roller 101 with the cam 102.

It is this mechanism which has just been described that is responsible for the automatic control of the descent of the ramming head and which effects a slow movement of said head while the patterns are being withdrawn from the mold cavities, but allows a relatively fast movement of the head at other times. It will be seen by referring to Fig. 11 where the profile of the cam 102 is clearly shown that the cam includes "low" parts at its opposite ends and a comparatively "high" part intermediate said "low" parts. The purpose of this arrangement will become apparent when the operation of the machine is described.

The roller 101 is journaled upon a pin 110 which extends a material distance beyond the roller and into the path of a foot 111 that is carried by the rear end of a push rod 112 that is slidable through a hole in the column 5, the rod extending forwardly of the machine where it is equipped with a knee plate 113. The rod is urged forwardly by a coil spring 114 that is confined between the knee plate and a guide 115 that is carried by the column 5 (see Fig. 5). The rod is held against turning so as to prevent removal of the foot 111 from the path of the pin 110 by means of a plate 116 that is secured to said rod and has an aperture through which is engaged a pin 117 that extends rearwardly from the column 5, the plate 116 riding along said pin as the rod 112 is reciprocated. By means of this contrivance the operator is enabled to actuate the valve 92 from a position in front of the machine for a purpose which will presently appear.

Brackets 140 project inwardly from columns 4 and 5 immediately above the base of the machine and each bracket has pivotally connected to its inner end a unit including arms 141, the upper ends of which are disposed adjacent the front and rear portions of the pattern frame 38. These units are rocked simultaneously in opposite directions by reason of their being connected together by a link 142 which has one of its ends connected to one of the rear arms 141 above the pivotal axis thereof and to the other rear arm at a point below its pivotal axis (see Fig. 2). Also connected to the lower end of the last mentioned arm is the inner end of a rod 145 which is guided through a bracket 146 that is carried by the column 4, and beyond said bracket the rod has operatively connected to it the lower end of a lever 147 that is pivoted at 148 to the column 4. The upper end of the lever 137 is in the path of an abutment 149 that is carried by the bearing sleeve 16 of the pressure head 17. Extending laterally from the lever 147 is an arm 150 along which a weight 151 is adjusted. This weight tends to swing the lever 147 in a clockwise direction, as the lever is viewed in Fig. 2. This contrivance is for arresting and sustaining the flask during the descent of the ramming head and it constitutes the subject matter of my copending application Serial No. 723,197, filed June 30, 1924. As it constitutes no part of my present invention further detailed description of it is deemed unnecessary.

In considering the operation of the machine it may be assumed that the pressure head 17 is released from the column 5 and swung rearwardly out of the way and that the operator has, according to custom, by a suitable air gun or other means, blown or removed all sand from the pattern 38ª and has placed the flask 42 and sand frame 47 in position, as illustrated in the drawings. He then fills the flask and sand frame with sand, scraping off any surplus to bring the top surface of the sand flush with the top edge of the sand frame 47. He then grasps the handle 35 and swings the pressure head into operative position above the ramming head, the latch 30 automatically engaging over the pin 29 to lock the pressure head in place. As the latch assumes effective condition, it depresses the rod 80 and lowers the lever 76, in opposition to the weight 78, out of the path of the depending end 75 of the valve operating handle 69. The operator then grasps said handle with his right hand and, with his left hand, swings the dog 70 out of the way of the lug 71 so that the valve 62 may be opened to admit pressure fluid from the accumulator 61 into the cylinder 7 whereupon the piston 8 and ramming head 10 will be elevated to carry the parts supported thereby into cooperation with the upper pattern. The quantity of air in the accumulator 61 causes the piston to rise rapidly and this effects a very desirable action as the sand is thrown about the upper pattern causing it to distribute itself evenly about the pattern and fill all interstices thereof; and when the effect of this initial inflow of air is spent the continued flow of pressure fluid from the supply line will impart a powerful pressure to the piston thereby to effectively compress the sand within the flask. As the flask is presented to the top pattern, the sand frame 47 telescopes over the pattern frame 39 until it is stopped, with its lower edge flush with the surface of the pattern, by stops 155. The lower edges of these stops may have a saw tooth formation so as to allow for displacement between the teeth of any sand which may be present on the top edge of the sand frame and thus prevent the sand frame from being improperly spaced with respect to the pattern by reason of the presence of sand between it and said stops. The sand frame is held in elevated position by means of spring fingers 156 which are carried by the pattern frame 39 and engage within cut-away portions 157 of the sand frame 47 (see Fig. 8).

With the mold-forming operation completed, the operator returns the handle 69 to its former position, shutting off communication, through the valve 62, between the accumulator 61 and the cylinder 7 and opening the cylinder to the exhaust 64 so that the fluid within the cylinder below the piston may escape.

As previously stated the descent of the ramming head is governed by the dash pots 12. As the plungers 11 descend within the dash pots the oil in the dash pots is displaced and forced through the pipes 89, 91 and 87 to the reservoir 85. However, the oil can be displaced from the dash pots only as fast as the valve 92 will permit. When the ramming head is elevated the roller 101 engages the "low" part of the cam 102 that is adjacent the lower end of said cam and with the parts in this position the valve 92 is nearly closed. Consequently the initial downward movement of the ramming head is retarded at the time the mold is being stripped from the upper pattern 39$^a$. Immediately after this the roller 101 rides upon the "high" part of the cam 102 and this results in the valve 92 being opened to quite a considerable extent whereupon the oil flows comparatively freely from the dash pots to the reservoir allowing the ramming head to descend rapidly until the roller 101 swings over to the "low" part adjacent the upper end of the cam. This causes the valve 92 to resume its former condition whereupon the movement of the ramming head is again retarded. This occurs at about the time the flask 42 engages the upper ends of the flask arresting and sustaining arms 141 and continues until the lower pattern is withdrawn from the mold. Just as soon as the pattern is clear of the mold the operator may engage his knee with the knee plate 113 and push the rod 112 rearwardly so as to project the shoe 111 against the pin 110 and rock the plate 99 against the action of the spring 105 in a direction to open the valve 92 so as to cause the ramming head to drop to its low position.

In preparing for the next operation of the machine, the operator grasps the lever 33 and releases the latch 30 from the pin 29 and swings the pressure head rearwardly. The doing of this moves the abutment 149 that is carried by the rear side of the pressure head bearing sleeve 16 away from the upper end of the lever 147, placing said lever under the influence of the weight 151. Said weight tends to rock the lever in a direction to push the rod 145 inwardly and, through the connections previously described between said rod and the flask sustaining arms 141, to throw the upper ends of the arms outwardly. If the flask has been removed from the arms 141 before the pressure head is swung rearwardly, said arms immediately respond to the action of the weight; but if not, they will remain in flask supporting position under the burden of the flask. When the flask is taken away, the arms swing outwardly to make way for the next flask.

The unlatching and swinging of the pressure head to inoperative position as above described results in removing the latch 30 from above the rod 80, whereupon the weight 78 is permitted to rock the lever 76 into the path of the down-turned end 75 of the operating handle 69, thus blocking the manipulation of the valve 62 until the pressure head is again returned to operative position. After the operator has cleaned the lower pattern 38 in the manner above described and has applied another flask to the pattern frame 38, he removes the sand frame 47 from the retaining means or fingers 156 and places it upon the flask. To enable him to conveniently dislodge the sand frame from the retaining means I provide a bail 160 that is pivoted at its ends to brackets 161 that depend from the head 17 and is formed to engage the ears 46 of the frame. The bail is yieldingly sustained in elevated position by a spring 162. By placing one hand in a position to catch the sand frame, the bail may be depressed with the other hand to remove the sand frame from the retaining means.

To prevent sand and grit in the presence of which machines of this character are required to operate from getting between the walls of the cylinder 7 and piston 8, I surround the upper end of the cylinder with a dust ring 165 of suitable packing material that is held in place by a clamping ring 166 secured to the cylinder by screws 167 (see Fig. 9). It will be observed that the piston is provided with a circumferential groove 168 immediately below its flanged upper end, and when the piston is at the bottom of its stroke the flange engages the ring 165 and squeezes it into the groove 168. Thus, upon each operation of the machine, the dust ring is restored to a form which insures its having perfect contact with the wall of the piston, and when the machine is at rest the dust excluding joint is rendered more effective by the projection of the dust ring into the groove.

The sprue cutter for producing the sprue in the mold, and which is illustrated in detail in Fig. 16, comprises a punch 170 and a tubular die 171, the former being secured to the upper pattern frame 39 by the screwing of its shank 172 into a threaded aperture in the pattern frame, and which may be facilitated by the application of a wrench to the wrench receiving portion 173 of the punch. The die 171 has its lower end threaded and screwed into an aperture in the lower pattern frame 38, the die being also provided with a wrench receiving portion. The hole or passageway through the die 171 is cylindrical, and the lower end of the punch 170 is of corresponding shape and size. During the mold-forming operation, the punch 170 displaces a quantity of sand and shoves it through the passageway in the die 171, the sand falling upon the roof shaped portion 175 of the ramming head 10 from where it is discharged to the front and rear of the machine. It will be seen from the foregoing that this unique construction of sprue cutter does not disturb the sand of the mold to any appreciable extent and is of such a character as will produce a clean and unobstructed sprue in the mold. The use of a sprue cutter of this character is made possible by the absolute alignment of the pressure and ramming heads effected through the pilot pins 50 and 51 and their respective socket members 52 and 53.

Having thus described my invention, what I claim is:

1. In a molding machine, the combination of a frame structure, a ramming head movably supported thereby, a pressure head carried by the frame structure and adapted to be moved to and from a position in operative relation to the ramming head, means for moving the ramming head toward and from the pressure head, and means carried by said heads and cooperating to properly align the heads as the ramming head approaches the pressure head.

2. In a molding machine, the combination of a frame structure, a ramming head movably supported thereby, a pressure head carried by the frame structure, means for moving the ramming head toward and from the pressure head, a pilot pin carried by one of said heads, and a receiving member for said pilot pin carried by the other of said heads.

3. In a molding machine, the combination of a frame structure, a ramming head supported thereby for vertical movement, a pressure head pivotally connected at one end to the frame structure so as to swing in a substantially horizontal plane to and from a position over the ramming head, patterns carried by the respective heads, a pilot pin rising from each end of the ramming head, and a socket member depending from each end of the pressure head for the reception of the corresponding pilot pin.

4. In a molding machine, the combination of a base, columns rising from the opposite ends of the base, a ramming head supported by the base for vertical movement, a pressure head having one of its ends pivotally connected to one of said columns and its opposite end designed for holding engagement with the other column, patterns supported by the respective heads, a pilot pin rising from each end of the ramming head, a socket member carried by each end of the pressure head for the reception of the corresponding pilot pin.

5. In a molding machine, the combination of a frame structure, a ramming head supported thereby for vertical movement, a pressure head pivoted at one end to the frame structure so as to be swung in a substantially horizontal plane to and from a position above the ramming head, a pattern carried by the pressure head, heating means for said pattern, and means carried by, and cooperating to properly align, the heads as the ramming head approaches the pressure head, said means being designed to allow for longitudinal contraction and expansion of the pressure head.

6. In a molding machine, the combination of a frame structure, a ramming head supported thereby for vertical movement, a pressure head that is pivotally connected at one end to the frame structure, a pattern carried by the latter head, heating means for said pattern, a pilot pin carried by one of said heads adjacent the free end of the pressure head, a receiving member for said pilot pin carried by the other of said heads, the pilot pin receiving member being designed to prevent relative movement between the heads in a direction transversely of the pressure head while allowing for expansion and contraction of said head in a longitudinal direction.

7. In a molding machine, the combination of a frame structure, a ramming head supported thereby for vertical movement, a pressure head pivotally connected at one end to the frame structure so as to swing in a substantially horizontal plane to and from a position over the ramming head, patterns carried by the respective heads, means for heating said patterns, a pilot pin rising from each end of the ramming head, a socket member depending from each end of the pressure head for the reception of the corresponding pilot pin, the pilot pin and socket member which are located adjacent the free end of the pressure head being designed to prevent relative movement between the heads in a direction transversely of the pressure head while allowing for expansion and contraction of the pressure head in a longitudinal direction.

8. In a molding machine, the combination of a base, columns rising from the opposite ends of the base, a ramming head supported by the base for vertical movement, a pressure head having one of its ends pivotally connected to one of said columns and its opposite end designed for holding engagement with the other column, patterns supported by the respective heads, means for heating said patterns, a pilot pin rising from each end of the ramming head, a socket member carried by each end of the pressure head for the reception of the corresponding pilot pin, the pilot pin furthest removed from the pivotal axis of the pressure head being flattened on its front and rear sides while the corresponding socket member has an opening within which the pilot pin accurately fits in a fore-and-aft direction but wherein the pin is afforded movement in a lateral direction.

9. In a molding machine, the combination of a base, columns rising from the opposite ends of the base, a ramming head supported by the base for vertical movement, a pressure head pivotally connected at one end to one of said columns and being designed at its opposite end for holding engagement with the other column, the connection between the pressure head and the latter column allowing limited movement between the head and column in a direction substantially parallel to the longitudinal axis of the head while preventing such movement in a direction at right angles thereto, patterns carried by the respective heads, and means for heating the pattern carried by the pressure head.

10. In a molding machine, the combination of a base, columns rising from the ends of the base, a ramming head supported by the base for vertical movement, a pressure head that is pivoted at one end to one of said columns and designed at the opposite end for holding engagement with the other column, the last mentioned column and the pressure head having contacting surfaces which meet in a plane substantially parallel to the longitudinal axis of the pressure head thereby to definitely position the pressure head with respect to the base in a direction transversely of said axis, patterns carried by the respective heads, and means for heating the pattern sustained by the pressure head.

11. In a molding machine, the combination with a base, columns rising from the ends of the base, a ramming head supported by the base for vertical movement, a pressure head pivotally connected at one end to one of said columns and being designed at the opposite end for holding engagement with the other column, latch mechanism for locking the pressure head to the last mentioned column, power means for operating the ramming head, control mechanism for said power means, and a contrivance for preventing the actuation of the control mechanism and which is rendered ineffective by the aforesaid latch when the pressure head is in locked position.

12. In a molding machine, the combination of a base, columns rising from the opposite ends of the base, a pressure head having one of its ends pivotally connected to one of said columns and its opposite end designed for holding engagement with the other column, a latch associated with the last mentioned end of the pressure head for locking it to the column, a ramming head supported by the base for movement toward and from the pressure head, pressure fluid means for moving the ramming head, a pressure fluid valve for controlling said pressure fluid means, an operating handle for said valve, a member that is adapted to block the movement of said handle in a direction to open the valve, and operative connections through which said member is removed from effective position by the aforesaid latch when the pressure head is in locked position.

13. In a molding machine, the combination of a base, columns rising from the opposite ends of the base, a ramming head supported by the base for vertical movement, a pressure head that is pivoted at one end to one of said columns and designed at the opposite end for holding engagement with the other column, an abutment carried by the upper end of the last mentioned column for resisting vertical movement of the adjacent end of the pressure head, and an anti-friction bearing supported by said column and over which the free end of the pressure head rides as it approaches the column.

14. In a molding machine, the combination of a base, columns rising from the opposite ends of the base, a ramming head supported by the base for vertical movement, a pressure head that is pivoted at one end to one of said columns and designed at the opposite end for holding engagement with the other column, an abutment carried by the upper end of the last mentioned column for resisting vertical movement of the adjacent end of the pressure head, an anti-friction bearing supported by said column and over which the free end of the pressure head rides as it approaches the column, and means for adjusting said anti-friction bearing in a vertical direction.

15. In a molding machine, the combination of a pressure head, a ramming head supported below the pressure head for movement toward and from the same, means for elevating the ramming head toward the pressure head, and means automatically controlling the descent of the ramming head and for imparting to it a variable speed, as and for the purpose specified.

16. In a molding machine, the combination of a pressure head, a ramming head supported below the pressure head for movement toward and from the same, patterns carried by the respective heads, a mold flask supported in a position to receive said patterns, means for elevating the ramming head, and means automatically controlling the descent of the ramming head and imparting thereto a variable speed, the ramming head moving slowly during the withdrawal of the patterns from the mold and at a relatively high speed during the remainder of its travel.

17. In a molding machine, the combination of a pressure head, a ramming head supported below the pressure head for movement toward and from the same, patterns carried by the respective heads, a mold flask supported in a position to receive said patterns, means for elevating the ramming head, means automatically controlling the descent of the ramming head and imparting thereto a variable speed, the ramming head moving slowly during the withdrawal of the patterns from the mold and at a relatively high speed during the remainder of its travel, and manually operable means for rendering ineffective at will the automatic means.

18. In a molding machine, the combination of a pressure head, a ramming head supported for vertical movement toward and from the pressure head, means for moving the ramming head toward the pressure head, a dash pot for controlling the descent of the ramming head, and means automatically controlling the escape of fluid from the dash pot so as to effect a variable speed of the ramming head, as and for the purpose specified.

19. In a molding machine, the combination of a pressure head, a ramming head supported for vertical movement toward and from the pressure head, means for elevating the ramming head, a dash pot for controlling the descent of the ramming head, a valve for governing the escape of fluid from the dash pot, and means carried by the ramming head for automatically actuating said valve to effect a variable speed of the ramming head.

20. In a molding machine, the combination of a base, a pressure head fixed with respect to the base and a ramming head supported by the base for vertical movement toward and from the pressure head, means for elevating the ramming head, a dash pot for controlling the descent of the ramming head, a valve for governing the escape of fluid from the dash pot, a cam carried by the ramming head, a member arranged to be engaged and moved by the cam, and adjustable connections between said member and the actuating element of the valve.

21. In a molding machine, the combination of a base, a pressure head fixed with respect to the base and a ramming head supported by the base for vertical movement toward and from the pressure head, means for elevating the ramming head, a dash pot for controlling the descent of the ramming head, a valve for governing the escape of fluid from the dash pot, a cam carried by the ramming head for actuating the valve, and means carried by the base for actuating the valve independently of the cam.

22. In a molding machine, the combination of a base, a pressure head supported above the base, a ramming head supported by the base for vertical movement toward and from the pressure head, means for elevating the ramming head, dash pots for controlling the descent of the pressure head, a liquid reservoir, means for conducting pressure fluid to the reservoir for the purpose of displacing the liquid therein, communicative connections between the reservoir and the dash pots, said connections including a check valve for preventing the return of liquid through said connections, other connections through which the liquid may escape from the dash pots and return to the reservoir, a valve in the last mentioned connections, and means carried by the ramming head for operating said valve.

23. In a molding machine, the combination of a base, a pressure head supported above the base, a ramming head sustained by the base for vertical movement toward and from the pressure head, means for moving the ramming head, a dash pot for controlling the descent of the ramming head, a valve for governing the escape of fluid from the dash pot, a member that is adapted to be oscillated on an axis substantially coincident with the stem of said valve, a bearing member adapted to be connected to the former member at various points circumferentially of said former member and eccentric with respect to the axis thereof, and means carried by the ramming head for cooperation with said bearing member and serving to oscillate the same during the movement of the ramming head thereby to adjust the valve and effect a variable speed of the ramming head.

24. In a molding machine, the combination of a base, a pressure head supported above the base, a ramming head sustained by the base for vertical movement toward and from the pressure head, means for moving the ramming head, a dash pot for controlling the descent of the ramming head, a valve for governing the escape of fluid from the dash pot, a member that is adapted to be oscillated on an axis substantially coincident with the stem of said valve, a bearing member adapted to be connected to the former member at various points circumferentially of said former member and eccentric with respect to the axis thereof, means carried by the ramming head for cooperation with said bearing member and serving to oscillate the same during the movement of the ramming head thereby to adjust the valve and effect a variable speed of the ramming head, and means for manually opening said valve when it is desired to drop the ramming head.

25. In a molding machine, the combination with relatively movable heads, of power means for effecting said relative movement, a manually operable control device for said power means, and a latch for said control device which is adapted to be manually released.

26. In a molding machine, the combination with a pressure head, of a ramming head movable toward and from the pressure head, power means for moving the ramming head, a control device for said power means, an operating handle for actuating the control device, and a latch for locking said operating handle and which is adapted to be manually released.

27. In a molding machine, the combination of a pressure head, a ramming head movable toward and from the pressure head, pressure fluid means for moving the ramming head, a valve for controlling the delivery of pressure fluid to said pressure fluid means, an operating handle for said valve, and a latch for maintaining said handle in the position it occupies when the valve is closed, said latch being adapted to be manually released.

28. A molding machine comprising, in combination, relatively movable heads, power means for effecting such relative movement, and a control for said power means involving two manually operable actuators and thus requiring the use of both hands of the operator to set the power means in operation.

29. In a molding machine, the combination of a pressure head, a ramming head movable toward and from the pressure head, a pattern carried by the pressure head, the ramming head being adapted to support a flask and a superposed sand frame in operative relation to the pattern, means for moving the ramming head toward the pressure head thereby to present the flask to the pattern, and friction means carried by the pressure head for retaining the sand frame in elevated position when the ramming head is retracted.

30. In a molding machine, the combination of a pressure head, a ramming head movable toward and from the pressure head, a pattern carried by the pressure head, the ramming head being adapted to support a flask and a superposed sand frame in operative relation to the pattern, means for moving the ramming head toward the pressure head thereby to present the flask to the pattern, means carried by the pressure head for retaining the sand frame in elevated position when the ramming head is retracted, and further means for dislodging the sand frame from the said retaining means.

31. In a molding machine, the combination of a pressure head, a ramming head movable toward and from the pressure head, means for so moving the ramming head, a pattern carried by the pressure head, the ramming head being adapted to support a flask and a superposed sand frame in operative relation to the pattern, retaining means carried by the pressure head for frictionally engaging the sand frame when the same is elevated and serving to sustain it in elevated position when the ramming head is retracted, and a member pivotally connected to the pressure head and adapted to be swung into engagement with and dislodge the sand frame from the retaining means.

32. In a molding machine, the combination of a frame structure, a pressure head supported thereby, a ramming head sustained by said structure for movement toward and from the pressure head, a pattern frame carried by the pressure head, a pattern secured to said pattern frame, the ramming head being adapted to support a flask and superposed sand frame in operative relation to the pattern, the sand frame, when the ramming head is moved toward the pressure head, telescoping over the pattern frame, retaining members carried by the pressure head for yieldingly engaging the sand frame and holding it elevated when the ramming head descends, and a member pivotally connected to the pressure head and adapted to be rocked into engagement with parts of the sand frame for dislodging the sand frame from said retaining members.

33. In a molding apparatus of the character set forth, the combination of opposed heads that are arranged one above the other, pattern frames supported by the respective heads, the frame associated with the lower head having an opening into register with which a hollow die member is adapted to be arranged, the upper pattern frame being adapted to carry a punch for cooperation with the die member, the portion of the lower head below the opening of the corresponding pattern frame being roof-shaped so as to shed the sand that is projected through the die member by said punch.

34. In a molding machine, the combination of a pressure fluid cylinder, a piston therein, a ramming head carried by the piston, and a dust ring of packing material surrounding the open end of the cylinder and engaging the piston.

35. In a molding machine, the combination of a pressure fluid cylinder, a piston therein, a ramming head carried by the piston, and a dust ring of packing material surrounding the open end of the cylinder for wiping engagement with the wall of the piston, the piston having a circumferential groove and a shoulder adjacent the same, the shoulder being arranged to engage the dust ring and force it into groove when the piston is in retracted position.

36. In a molding machine, the combination of relatively movable heads, patterns carried by the respective heads and between which a mold flask is adapted to be supported, the patterns being adapted to have rigidly connected to them, respectively, a punch and a die that cooperate and constitute a sprue cutter, and pilot means for properly aligning the heads during the mold-forming operation.

37. In a molding machine, the combination with a reciprocatory ramming head, a pattern and a mold flask carried thereby, of means for arresting movement of the flask during continued movement of said head and pattern, a dash pot for controlling the speed of movement of said head, and means for varying the restriction of said dash pot to retard movement of the head during the drawing of the pattern from the mold.

38. In a molding machine, the combination with a reciprocatory ramming head, a pattern and a mold flask carried thereby, of means for arresting movement of the flask during continued movement of the head and pattern to draw said pattern from the mold, and means for modifying the speed of said head at a predetermined intermediate period during its descent as and for the purpose specified.

39. In a molding machine, the combination with a reciprocating ramming head, a pattern and a mold flask carried thereby, of means for arresting movement of the flask during continued movement of the head and pattern to draw said pattern from the mold, and means including a member carried by said head for modifying the speed of the head at a predetermined intermediate period during its descent, said means also permitting a greater speed of movement in other periods of travel.

In testimony whereof, I hereunto affix my signature.

FRANK E. McCABE.